United States Patent [19]

Buchala et al.

[11] Patent Number: 5,638,521
[45] Date of Patent: Jun. 10, 1997

[54] APPARATUS USING A PARALLEL INTERFACE FOR DATA TRANSFER BETWEEN A PLURALITY OF COMPUTERS, AS WELL AS FOR TRANSFER OF DATA FROM COMPUTERS TO SHARED PERIPHERAL DEVICES

[75] Inventors: Christoph Buchala, Troisdorf; Peter Leunig, Neunkirchen, both of Germany

[73] Assignee: Leunig GmbH, Siegburg, Germany

[21] Appl. No.: 596,658

[22] Filed: Feb. 5, 1996

Related U.S. Application Data

[63] Continuation of Ser. No. 135,063, Oct. 12, 1993, abandoned.

[30] Foreign Application Priority Data

Oct. 12, 1992 [EP] European Pat. Off. ............ 92117418

[51] Int. Cl.⁶ .................. G06F 13/00; G06F 13/14; G06F 15/163
[52] U.S. Cl. ............ 395/311; 395/312; 395/281; 395/200.01
[58] Field of Search ................ 395/311, 312, 395/281, 200.01, 871, 800, 822, 835, 839, 114; 370/54

[56] References Cited

U.S. PATENT DOCUMENTS

| | | | |
|---|---|---|---|
| 3,634,830 | 1/1972 | Baskin | 395/325 |
| 3,654,603 | 4/1972 | Gunning et al. | 371/11.2 |
| 4,551,831 | 11/1985 | Vaughn | 307/58.2 |
| 4,692,862 | 9/1987 | Cousin et al. | 395/311 |
| 4,839,793 | 6/1989 | Brunk | 395/275 |
| 4,849,883 | 7/1989 | Mitchell et al. | 395/101 |
| 4,896,289 | 1/1990 | Svinicki et al. | 364/900 |
| 4,901,305 | 2/1990 | Tangonan | 359/117 |
| 4,994,963 | 2/1991 | Roden et al. | 395/325 |
| 5,014,221 | 5/1991 | Mogul | 395/113 |
| 5,133,055 | 7/1992 | Lieberman et al. | 395/889 |
| 5,247,623 | 9/1993 | Sun | 395/325 |
| 5,276,879 | 1/1994 | Barry et al. | 395/650 |
| 5,280,585 | 1/1994 | Kochis et al. | 395/868 |
| 5,295,260 | 3/1994 | Pribnow | 395/183.01 |
| 5,297,246 | 3/1994 | Horiuchi et al. | 395/150 |
| 5,307,462 | 4/1994 | Hastings | 395/830 |
| 5,309,564 | 5/1994 | Bradley et al. | 395/200 |
| 5,313,580 | 5/1994 | Remion | 395/200 |
| 5,363,484 | 11/1994 | Desnoyers et al. | 395/200.07 |
| 5,418,911 | 5/1995 | Zilka et al. | 395/310 |
| 5,438,671 | 8/1995 | Miles | 395/200.01 |
| 5,555,543 | 9/1996 | Grohoski et al. | 370/58.1 |

OTHER PUBLICATIONS

IBM Technical Disclosure Bulletin, DeBry et al., "Print Authorization Matrix," vol. 20, No. 6 (Nov. 1977).

*Primary Examiner*—Gopal C. Ray
*Attorney, Agent, or Firm*—Edwin D. Schindler

[57] ABSTRACT

An apparatus having a plurality of computers for the selective data transfer from the computers to, at least, one shared output device, or for file transfer between the computers, is provided. Each computer has a parallel interface which is connected, by way of a first printer cable, to the parallel inlets of a connecting element. The connecting element includes one or more outputs which are connected by way of a second set of parallel printer cables to the inputs of one or more output devices, such as printers. The file transfer occurs over the first parallel printer cable, or cables, and the connecting element after generating the required signal connections. The apparatus permits a selective data transfer to one or more output devices and file transfer between computers over the same parallel computer interfaces and over the same physical cables.

8 Claims, 6 Drawing Sheets

APPARATUS USING A PARALLEL INTERFACE FOR DATA TRANSFER BETWEEN A PLURALITY OF COMPUTERS, AS WELL AS FOR TRANSFER OF DATA FROM COMPUTERS TO SHARED PERIPHERAL DEVICES

This is a continuation of application Ser. No. 08/135,063, filed Oct. 12, 1993, now abandoned.

BACKGROUND OF THE INVENTION

1. Technical Field of the Invention

The present invention relates to an apparatus having a plurality of computers, particularly personal computers (PC's), for the selective transfer of data from such computers to, at least, one shared output device, e.g., a printer, or for the file transfer between the computers by way of a parallel interface.

2. Description of the Prior Art

Known to the prior art, there are devices for the connection of one or more shared printers to a plurality of PC's, whereby the parallel interface of each PC is connected over a conventional parallel printer cable to a printer sharing device (PSD), which in turn is connected over a conventional parallel printer cable to the parallel interface of the printer. Each PC can now transmit data to the printer. If the PSD possesses a memory, the PC's may also transmit data simultaneously. While a PSD is required, the shared printer affords considerable cost savings when compared to PC's equipped with their own printer. In order to transfer files between the PC's over the parallel interface, it is necessary to disconnect the parallel printer cables and connect the interfaces with the special cable included with the file transfer program. Hence, the switch-over from data transfer to file transfer between the computers entails a re-connection of the cables, or else a second parallel interface must be installed in the PC's, thereby permitting simultaneous connection of the conventional printer cable for the transfer of data to the printer and the special cable for the transfer of files to another computer. In practice, this is a time-consuming and most undesirable practice.

Originally, the parallel interface was designed solely for unidirectional data transfer from the computer to the printer. (Bi-directional variants of the parallel interface have since been developed, but they lack standardization and are by no means available for all computers.) Hence, computers have only one data output and printers have only one data input. In addition, there are some control circuits to the printer and some status lines between the printer and the computer, monitoring the status of the printer. Therefore, any file transfer program wishing to transfer data to the computer over a parallel interface would have to utilize the status line from the printer as a data communication line to the computer. To begin with, this would require a special cable with a cross-over conductor allocation; secondly, there is no standard for it. Any supplier of such a program could select his own cable allocation so that, in theory, there could be a great many different allocations.

SUMMARY OF THE INVENTION

It is, therefore, an object of the present invention to provide an apparatus for a plurality of computers, e.g., personal computers, which allows for the same parallel computer interface and the same physical cable to selectively transfer data to one or more output devices, e.g., printers, and transfer files between the plurality of computers.

It is a further object of the present invention to provide an apparatus for a plurality of computers, notably PC's, which permits selective data and file transfer independent of the type of computer and the chosen file transfer program.

It is an additional object of the present invention to overcome the limitations inherent in prior art devices as described heretofore.

The foregoing and related objects are achieved by the apparatus of the present invention wherein a parallel interface in each computer of a plurality of such computers is connected over a parallel printer cable to one of the parallel inputs of a connecting link whose output or outputs are connected over one or more parallel printer cables to the input of the output device or devices and that the file transfer occurs over the parallel printer cable and the connecting element once the required signal connection is established.

The apparatus of the present invention obviates the need for reversing or re-connecting the cables in switching over from data transfer to file transfer and vice-versa; the one parallel interface normally available on the PC suffices for this purpose and the switch can be accomplished practically and without time interruption. Even in the presence of a larger number of computers, the present invention permits a file transfer between any two computers without the need for a direct cable connection between these two computers.

In a preferred embodiment of the apparatus according to the invention, at least one computer programs a programmable matrix creating the signal connection required for file transfer. This technique of providing a variable matrix connection makes it possible to simulate every feasible cable allocation and, hence, also the allocation needed for the particular file transfer. In this embodiment, it is feasible to link, with the programmable matrix, all signal outputs of the computer with all signal inputs of the associated computer.

The preferred embodiment of the invention is realizable by hardware or combined hardware/software technology. The advantage of the hardware approach is that it does not impair the speed of transfer between computer; the drawback is that it involves a number of logic functions hardly feasible with standard components at a reasonable cost and requiring, instead, a special large-scale integration chip to bring down the cost and the size of the apparatus.

The combined hardware/software technology works with one processor and is less costly. The matrix, switching circuit and sequence decoder (cf. FIG. 2, infra), may be at least, in part, replaced by software and the remaining hardware components may be achieved with standard building blocks. The drawback of this technology lies in the fact that the speed of data communication may be greatly restricted depending on the processor in use.

In the case of the preferred embodiment of the invention, the matrix may be programmed by a driver program (A), which programs and creates the connection, and after termination of the file transfer program (B), by another driver program (C) which cancels the file transfer connection and restores the printer connection. Program (A) is designed to configure the matrix consistent with the available file transfer program and create the circuit by which the signal may be imparted to abolish the printer link and create the connection to another computer. As the sequence of program (A) is transmitted, the printer connection is automatically interrupted and switched over to the matrix. The target computer is still able to print, so that a file transfer is not yet feasible. Once the target computer has transmitted this program sequence, it is itself switched over to the matrix, thereby achieving the computer/computer connection.

Program (B) is any file transfer program at will, including such commercially available programs as the Laplink, the FastLynx, and the Brooklyn Bridge, or such other file transfer programs as may become available in the future. Program (C) is called up after the end of the file-transfer program, in order to override the computer-to-computer link and restore the computer-to-printer connection. Needless to say, the sequence of the programs (A) through (C) may be activated by a batch program. Lastly, a program (D) may be installed, designed to generate its own program (A) when a file transfer program (B) is utilized requiring a new cable allocation. The allocation may be found in the handbook supplied with the file transfer program.

In a further embodiment of the claimed apparatus, there is provided a fixed and defined file transfer connection activated by polling or by a special signal sequence from the two computers. This embodiment may be utilized if designed for one single software manufacturer or for a group of software manufacturers whose file transfer programs work with one and the same cable allocation. In such an instance, the cost-consuming programmable matrix may be readily replaced by a fixed conductor hook-up.

The presently claimed apparatus permits transferring as many as 62,000 characters per second (cps) to the printer, thus, safeguarding in full the speed of the file transfer program. Notwithstanding the use of one and the same physical cable for printing and file transfer, its maximum operating speed is not impaired.

Other objects and features of the present invention will now be described in detail with reference being made to the accompanying drawing figures. It should, however, be noted that the drawing figures illustrate preferred embodiments of the present invention and are not intended as a means for defining the scope and limits thereof.

BRIEF DESCRIPTION OF THE DRAWING FIGURES

In the drawing, wherein similar reference numerals denote similar features throughout the several views.

DETAILED DESCRIPTION OF THE DRAWING FIGURES AND PREFERRED EMBODIMENTS

Figure 1:
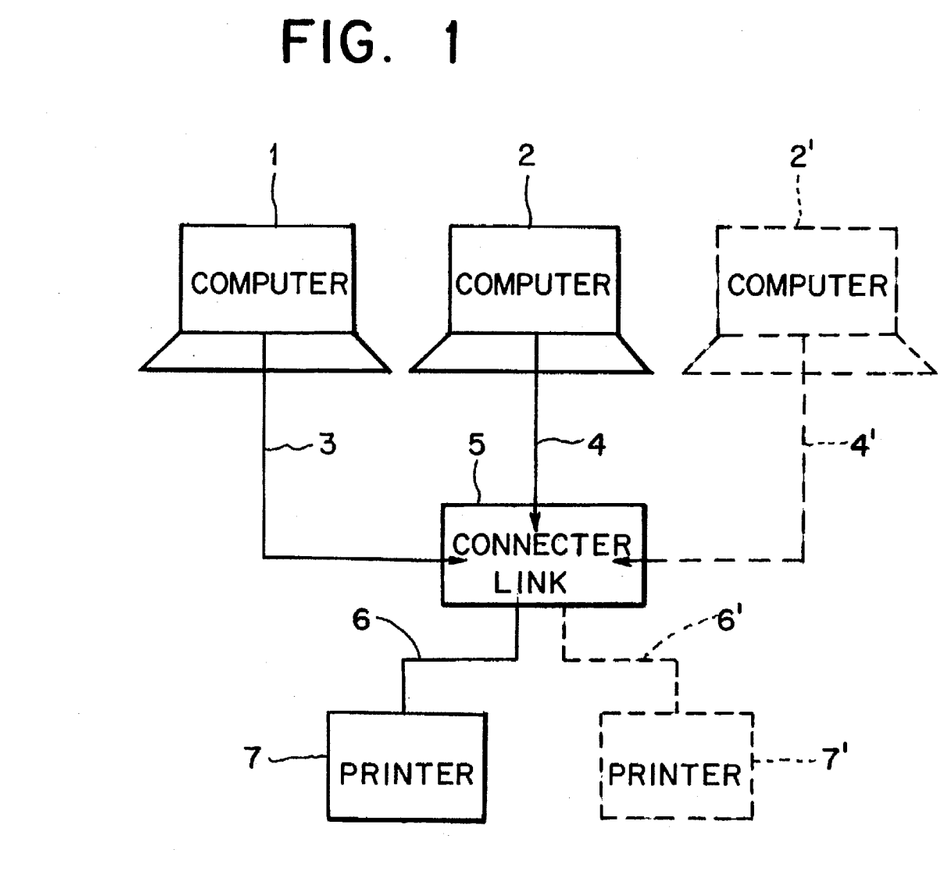
FIG. 1 is a schematic illustration of an embodiment of the apparatus of the present invention being operated with two computers.

Turning now, in detail, to an analysis of the accompanying drawing figures, as shown in FIG. 1, the parallel interface of the first computer 1 is connected by way of a conventional parallel printer cable 3 to a first parallel input of a connecting link 6. Similarly, the parallel interface of the second computer 2 is connected via a conventional parallel printer cable 4 to a second parallel input of the connecting link 5. Depending on the number of computers to be connected, the link 5 can have more than two inputs. Thus, a third computer 2' may be connected over another parallel printer cable 4' to a third input of the connecting link 5, as indicated by the dashes. The output of the connecting link 5 is connected over a conventional parallel printer cable 6 to the parallel input of a printer 7. The link 5 may possess at least one additional output, to be connected over a parallel printer cable 6' to the parallel input of at least one additional printer 7', as indicated by the dashes. Generally speaking, therefore, positions 4'2' may designate a plurality of linked computers and positions 6'7', a plurality of connected output devices.

The connecting link functions as a conventional PSD, that is to say, each of the connected computers may transmit data over the link 5 to the printer 7. If the link is provided with a memory, the computers may simultaneously transmit printing data. In the absence of a memory in the link 5, the transmitted data first reaching the printer 7 will be printed first.

On the other hand, in order to permit a file transfer between computers 1 and 2 over the cables 3 and 4, respectively, also used for printing, there will be installed between computers 1 and 2, along with the file transfer program (B), a small software program creating the required cable circuit and jack allocations, and forming the connection of such cables in their new allocation within the connecting link 5, thus, adapting the data channels 3, 5, 4 of the target computer to the special cable controlled by program (B), without the need for a physical connection of such a cable. This completes the file transfer circuit between computers 1 and 2, permitting bi-directional file transfer.

Once the file transfer is completed, the connecting link 5 receives an instruction from both computers to restore the normal cable and jack allocation required for data transfer, and to restore in link 5 the connection to printer 7.

Figure 2:
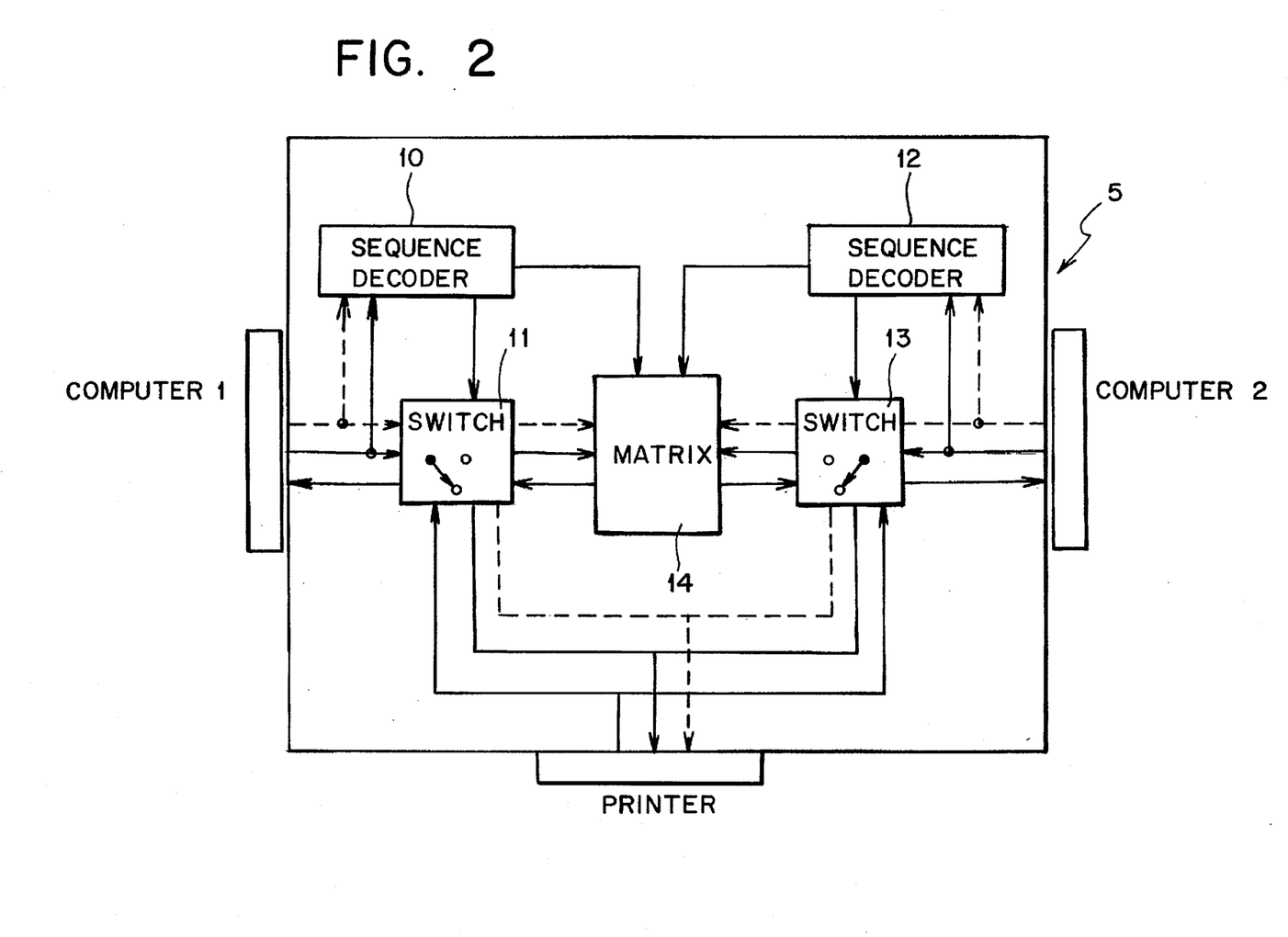
FIG. 2 shows, in principle, the configuration of the connecting link with a programmable matrix.

In FIG. 2, the eight data lines from the computer are indicated by solid lines; the control circuits from the computer are shown as dotted lines, and the status lines from the printer as thin lines. A sequence decoder 10 or 12 is associated with each of the two computers 1, 2 to decode the computer-generated control sequence for the activation and suppression of the file transfer hook-up. These sequences must be so configured as not to occur in the normal flow of data. Appropriately, this is accomplished by seizing the control circuits from the computers and shifting them to a status which cannot, or should not, occur in normal printing operations. In this embodiment of the invention, the sequence decoders 10, 12 receive two instructions: (1) to program the matrix; and, (2) to form the connection. In the presence of more than two computers, they may additionally specify the number of the selected target computer. Upon receiving the complete sequence, decoder 10 programs a programmable matrix 13 and switches, by way of switch 11, all circuits from and to computer 1, to one side of matrix 14 instead of printer 7. The computer-to-computer link is not established until such time as the computer 2 also signals its readiness to establish the connection by an identical sequence. By analogy to computer 1, decoding is performed by the sequence decoder 12 and the switch-over by the switch 13.

Now the link is established and the two computers can communicate with each other, as if they were connected directly to each other with a special cable.

Once the file transfer is completed, the connection between the computers is interrupted by a sequence initiated by computers 1 and 2, and so structured as not to occur in normal data communications between computers. The link is broken off just as soon as one of the two computers 1 or 2 transmits the disconnect sequence, at which time it is automatically re-connected to printer 7 by reversing the switch 11 or 13. The other computer cannot resume printing until it, too, transmits the disconnect sequence.

The advantage of this form of embodiment with a programmable matrix lies in the fact that it is independent of the file transfer program and is capable of simulating any conceivable special cable.

Figure 3:
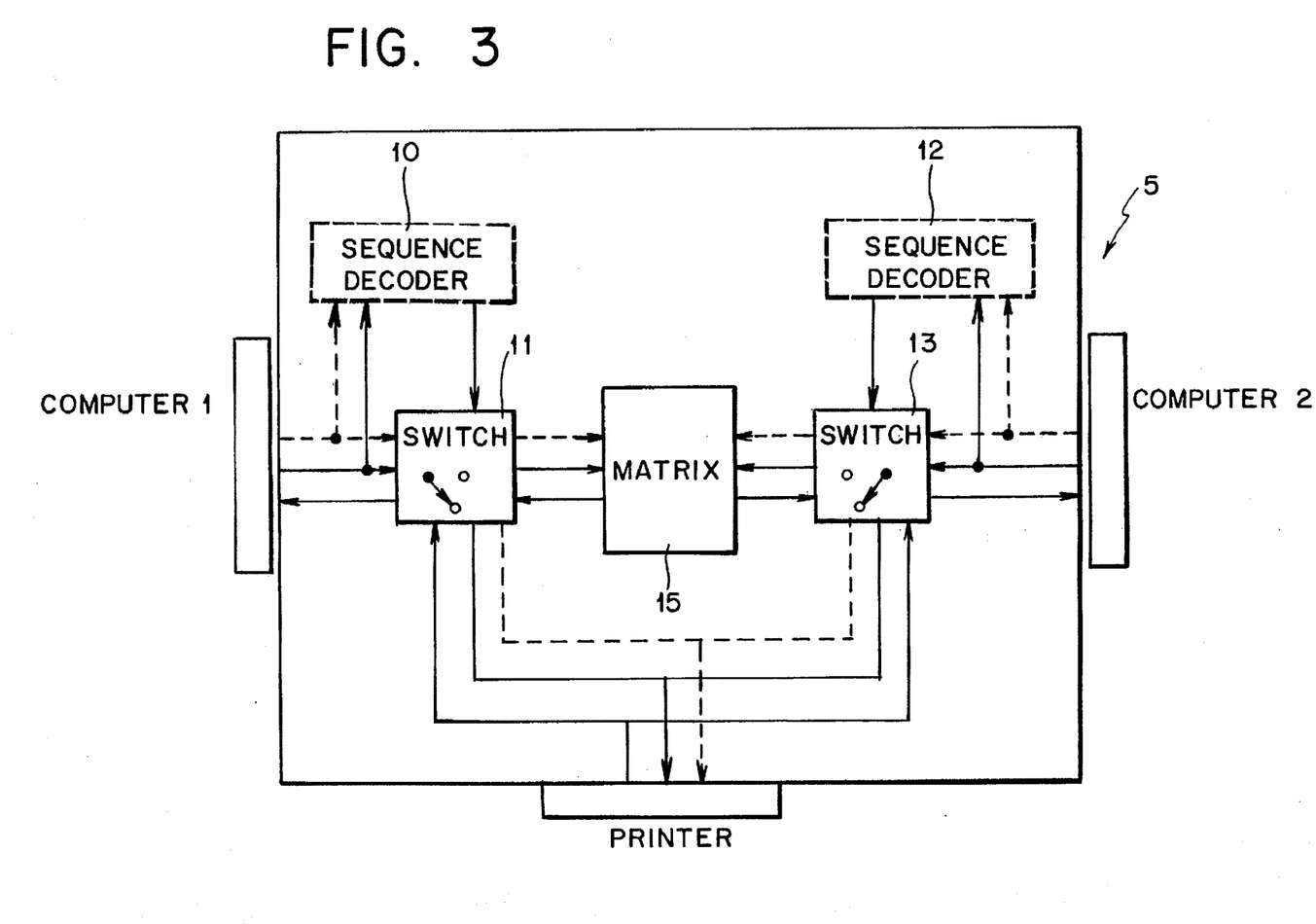
FIG. 3 shows the configuration of another embodiment of the connecting link with fixed cabling.

The embodiment of the connecting link illustrated in FIG. 3 replaces the programmable matrix 14 with hard wiring. The sequence decoders 10 and 12 merely serve to activate the switching circuits 11 or 13. In this form of embodiment of the present invention, the costs are further reduced in that the sequence circuits may be totally dispensed with utilizing, instead, a given combination of control circuits from computers 1 or 2 to activate the switching network 11 or 13. In such case, sequence decoders 10, 12 can be dispensed with. From the standpoint of cost effectiveness, it is a very good solution, but it is not completely protected against unintentional switch-overs. The form of embodiment illustrated in FIG. 3 is useful when the operation involves a single immutable file transfer program.

The following is a more detailed description of a preferred embodiment of the apparatus of the present invention:

1. Equipment

The following describes the implementation of the connecting link between two personal computers (PC) and a printer. To begin with, the unit permits a fully automatic switch-over between the computers, which may feature shared printers. Secondly, it forms a connection between the two computers by way of an emulation of a cable which may be defined at will. This requires nothing more than the "standardized CENTRONICS"* parallel interfaces of the two computers and the printer, along with the conventional parallel printer cable normally used to connect a computer with a parallel printer.

*Centronics is a registered trademark of Genicom Corporation

The apparatus of the invention has no memory, that is to say, the computers are capable of printing one after the other, but not simultaneously. This is a purely hardware-based embodiment of the invention utilizing a special large-scale integration (ASIC) chip.

Inasmuch as the apparatus of the invention supports both a plurality of file transfer programs and the emulation of any file transfer cable at will, it requires driver programs (A) and (C) in order to establish and disconnect the PC—PC link. A prerequisite for the apparatus is a cable definition (matrix of the signal connections), as coded in the set-up sequence and transmitted by the two computers, that is identical in each case. Beyond that, the inventive apparatus supports a self-testing function whereby the printer port is hooked up by way of a conventional parallel printer cable with one of the two computer ports (the so-called loopback progress), the connection being automatically recognized and optically confirmed. During the self-testing sequence, the printed circuit board, the interfaces and the cable itself are thoroughly tested.

2. Circuitry

Figure 4:
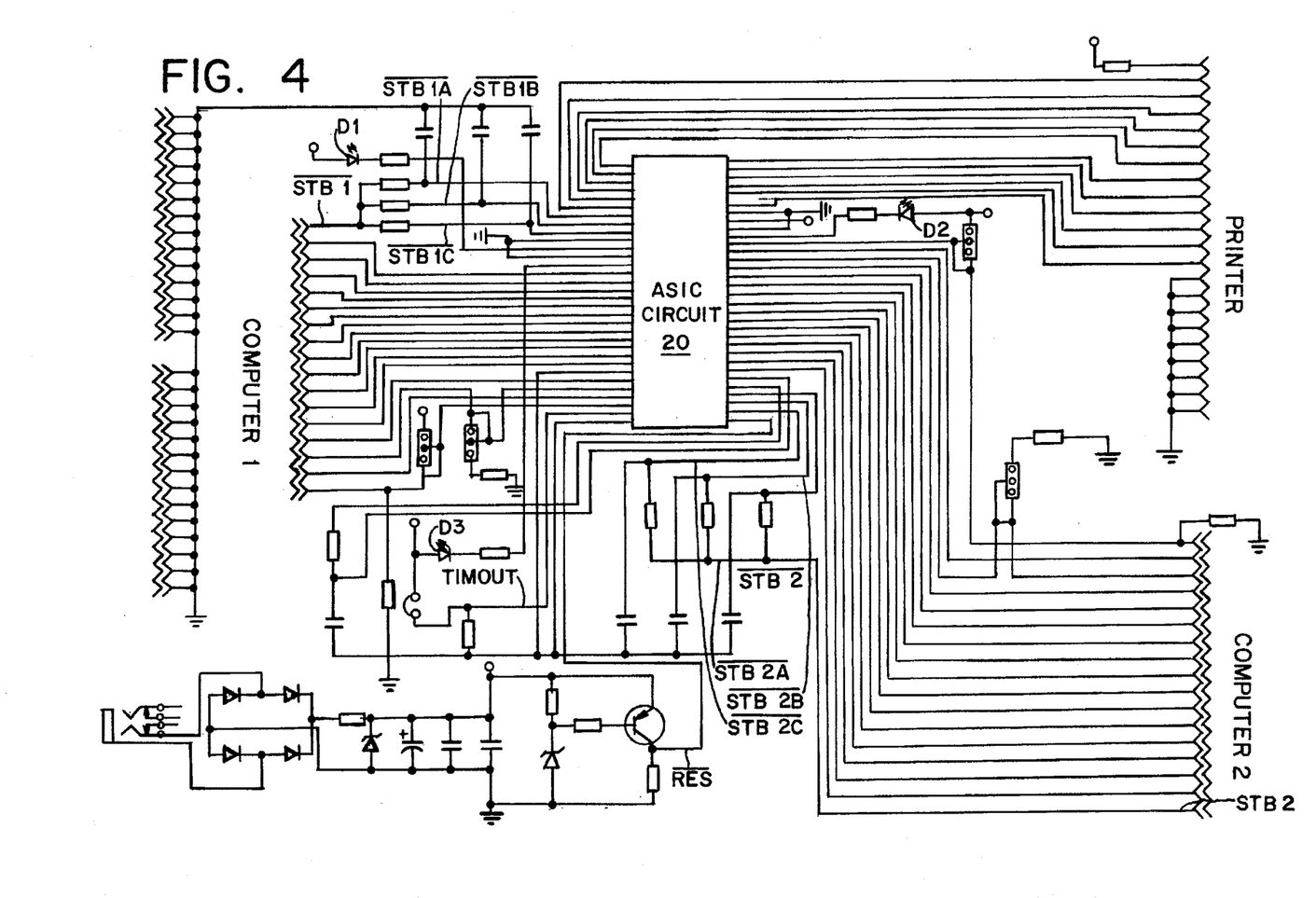
FIG. 4 is an embodiment of the connecting circuit shown in FIG. 2.

As illustrated in FIG. 4, the wiring of the apparatus of the invention is substantially integrated within an ASIC circuit 20. The external wiring of ASIC is designed in particular:

to provide DC or AC power to the device;

to initialize the chip (Signal "/RES");

to suppress cable interference (Signal "/STB1" and "STB2");

to select one of two default time periods required as the criterion for the termination of a so-called print job (TIMOUT); and, to visualize the actual port connections with the aid of three LED's.

D 1 for Computer 1/Printer connection

D 2 for Computer 2/Printer connection

D 3 for Computer 1/Computer 2 connection

Figure 5A:
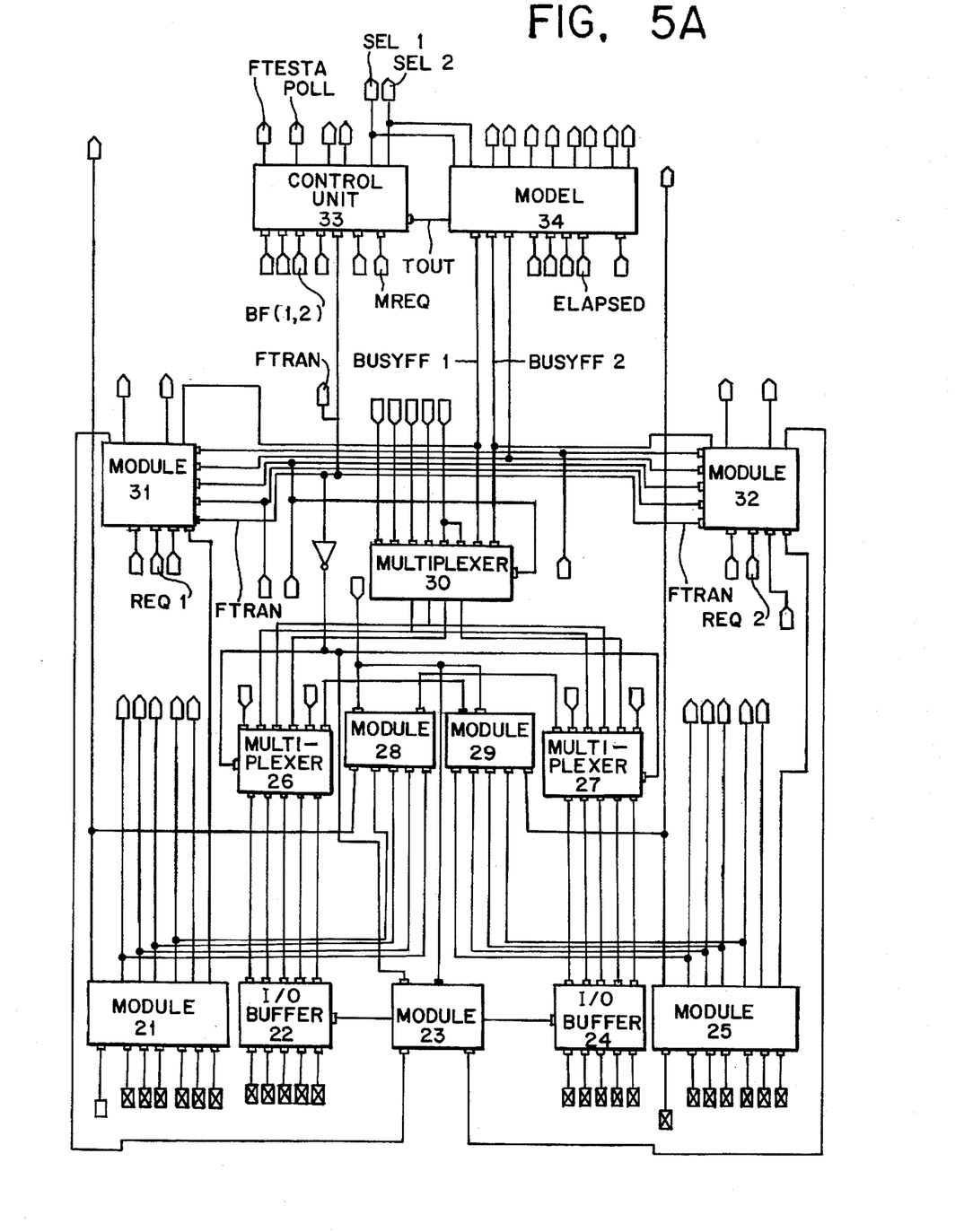
FIG. 5a is a partial overview of the ASIC large-scale integration chip.
Figure 5B:
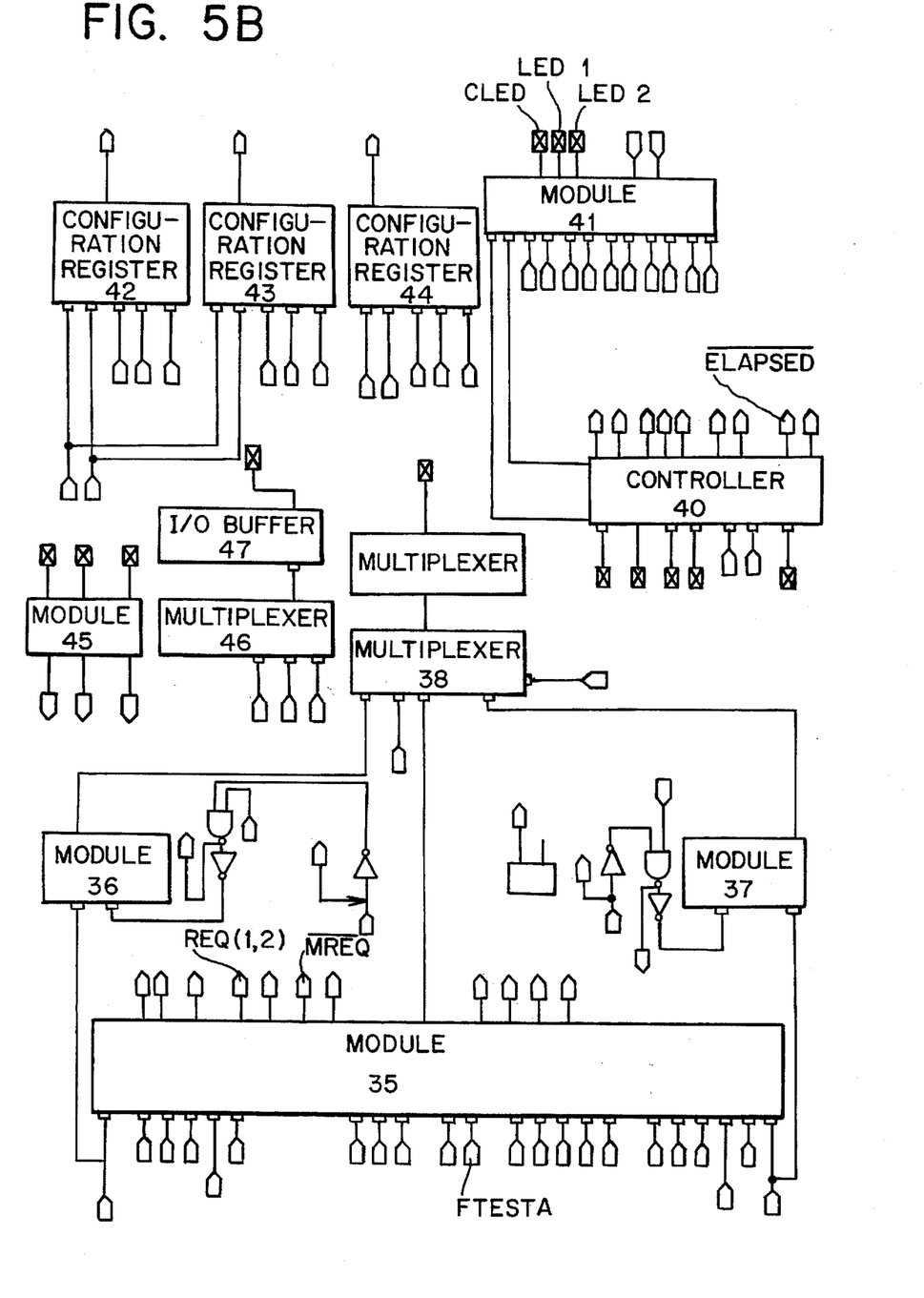
FIG. 5b is an overview of another part of the ASIC.

3. ASIC (FIGS. 5a and 5b)

When neither of the computers utilizes the printer, the LED's on the device (FIG. 4) light up alternatively at intervals of approx. 0.5 sec. Once a connection is established between PC and printer or PC/PC, one of the three LED's stays lit permanently, as directed by the signals "/LED1", "/LED2", and "/CLED" of the LED control module 41. The set-up and interruption of the connection is the function of the State Machine 33, the control unit constituting the entire switching circuit.

The start of each print job is recognized by module 31 (for Computer 1) or 32 (for Computer 32) and is communicated to control unit 33 by way of module 34 (a "BUSYFF" and a "BF" signal for each computer.) The appropriate computer-to-printer link is established by activating the signals "SEL1" and "SEL2". From this point on, the module 34 controls the appropriate input and output synchronization of the print data. The end of the print job is determined by Timing Controller 40 depending on the time elapsed since the transmittal of the last print character from the computer. At that time, the "ELAPSED" signal is activated and, after appropriate synchronization in module 34, it is transmitted to control unit 33 in the form of a "TOUT" signal. The State Machine 33 activates the "/POLL" signal whenever no active connection exists. Module 35, designed to recognize and generate the sequence, decodes the connect and disconnect sequence of the PC-PC link. On receipt of the complete set-up sequence, it elaborates in the configuration register 42, 43, 44 a matrix definition for the desired cable emulation. As long as only one computer has transmitted a build-up sequence, only one corresponding "REQ" signal is activated, blocking for the sake of safety the PC-printer link in Module 31 or 32. Beyond that, from this point on, the light emitting diode D3 of the device (FIG. 4) blinks alternatingly with the LED dedicated to the other PC ("/CLED" signal in module 41.) Only after receiving both connection sequences is this information transmitted to control unit 33. This is accomplished by having the decoder 35 activate an "/MREQ" signal (coupling of "REQ1" and "REQ2" signals.) The file transfer connection is established by control unit 33 through the "FTRAN" signal transmitted to the multiplexer 26 and 27. The LED D3 (FIG. 4) lights up permanently. The two computers can now intercommunicate. File transfer from one computer to the other utilizes the module 21-28-27-24 and in the opposite direction, the module 25-29-26-22. While the cables to be matrix-simulated feature identical cross-over circuits in both directions, the matrices 28 and 29 are identical, sharing a common configuration register comprising modules 42, 43, 44.

As soon as one of the computers transmits the disconnect sequence, the corresponding "REQ" signal is deactivated by way of the module 35 and with it, automatically, the shared "/MREQ" signal. The control unit 33 retrieves the "FTRAN" signal and switches to the "/POLL" state, thereby signifying that the computer-computer link has been interrupted. For reasons of safety, the other computer is only switched over to the printer by module 31 or 32 after it, too, has terminated its disconnect sequence.

Module 35 also serves for self-testing, activated by the "FTESTA" signal. It generates the necessary alternating patterns fed by the multiplexer 38, 46 to the printer port and by the multiplexer 30 to the computer ports. These patterns are transmitted through the loopback cable to the other port for re-verification in module 35.

The unused ports are switched by module 23 in the "tri-state" condition. Modules 36, 37 serve as a latch for the printing data from both computers. Modules 21, 25 and 45, as well as 22, 24 and 47, are I/O buffers.

The apparatus of the present invention allows for the operation of a plurality of computers in driving one shared printer, as well as file transfer between computers, with modest expense for hardware and a user-friendly design.

While only several embodiments of the present invention has been described or shown, it will be obvious to those of ordinary skill in the art that many modifications may be made to the present invention without departing from the spirit or scope thereof.

What is claimed is:

1. Apparatus for a selective data exchange between each of two of a plurality of computers, or between each of said computers and at least one peripheral device through their parallel ports, said apparatus comprising:

a plurality of computers with each of said computers having a parallel printer port;

at least one shared peripheral device having a parallel computer port; and, a connecting element having at least two computer ports, at least one peripheral port, and switching means, said parallel printer ports of said plurality of computers being connected to said computer ports of said connecting element by parallel printer cables and said parallel computer port of said at least one shared peripheral device being connected to said at least one peripheral port of said connecting element by parallel printer cables, said parallel printer cables comprising control and status lines for monitoring a status of the peripheral device during a normal operation mode, said switching means connecting at least one computer port thereof to said at least one peripheral port thereof for enabling a data exchange between the computer connected to said computer port of said connecting element and the peripheral device connected to said peripheral port, during the normal operation mode, and, said switching means connecting at least two computer ports of said connecting element by using a cable allocation, which enables a particular data transfer between said at least two computers connected to said at least two computer ports of said connecting element on said parallel printer cables, upon receiving a sequence of data on said control and status lines, which does not occur during the normal operation mode.

2. The apparatus for a selective data transfer according to claim 1, wherein said plurality of computers are personal computers.

3. The apparatus for a selective data transfer according to claim 1, wherein said shared peripheral device is a printer.

4. The apparatus for a selective data transfer according to claim 1, wherein said switching means comprises a programmable matrix, and wherein at least one computer of said plurality of computers includes means for programming said programmable matrix for defining different cable allocations, used by said switching means for connecting at least two computer ports of said connecting element together for transferring data in accordance with different file transfer protocols between computers, the parallel printer ports of which are connected to said at least two computer ports of said connecting element.

5. The apparatus for a selective data transfer according to claim 4, wherein said programmable matrix is programmed by a first driver program, which programs and generates said connection between said at least two computer ports of said connecting element using a specific cable allocation associated with a particular file transfer protocol and, after completion of a file transfer program using said file transfer protocol, a second driver program aborts said connection for file transfer and restores a connection of said at least one computer port of said connecting element with said at least one peripheral port of said connecting element.

6. A connecting element for a selective data exchange between each of two of a plurality of computers, each of said computers having a parallel printer port, or between each of said computers and at least one peripheral device having a parallel computer port, said connecting element comprising at least two computer ports, at least one peripheral port and switching means, wherein, said parallel printer ports of said plurality of computers are connected to said computer ports of said connecting element by parallel printer cables and said parallel computer port of said at least one shared peripheral device being connected to said at least one peripheral port of said connecting element by parallel printer cables, said parallel printer cables comprising control and status lines for monitoring a status of the peripheral device during a normal operation mode, said switching means connecting at least one computer port thereof to said at least one peripheral port thereof for enabling a data exchange between said computer connected to said computer port of said connecting element and said peripheral device connected to said peripheral port, during the normal operation mode, and, said switching means connecting at least two computer ports of said connecting element by using a cable allocation for enabling a specific data transfer between said at least two computers connected to said at least two computer ports of said connecting element on said parallel printer cables, upon receiving a sequence of data on said control and status lines, which does not occur during the normal operation mode.

7. The connecting element according to claim 6, wherein said switching means comprises a programmable matrix, and wherein at least one computer of said plurality of computers includes means for programming said programmable matrix for defining different cable allocations, used by said switching means for connecting at least two computer ports of said connecting element together, for enabling a data transfer in accordance with different file transfer protocols between computers, the parallel printer ports of which are connected to said at least two computer ports of said connecting element.

8. The connecting element according to claim 7, wherein said programmable matrix is programmed by a first driver program, which programs and generates said connection between said at least two computer ports of said connecting element using a specific cable allocation associated with a particular file transfer protocol and, after completion of a file transfer program using said file transfer protocol, a second driver program aborts said connection for file transfer and restores the connection of at least one of said computer ports of said connecting element with at least one of said peripheral ports of said connecting element.

* * * * *